United States Patent
Mu

(10) Patent No.: US 10,535,324 B2
(45) Date of Patent: Jan. 14, 2020

(54) DISPLAY DEVICE AND DISPLAY METHOD THEREOF

(71) Applicant: BOE TECHNOLOGY GROUP CO., LTD., Beijing (CN)

(72) Inventor: Xinxin Mu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/941,860

(22) Filed: Mar. 30, 2018

(65) Prior Publication Data

US 2018/0374456 A1  Dec. 27, 2018

(30) Foreign Application Priority Data

Jun. 26, 2017 (CN) .......................... 2017 1 0494726

(51) Int. Cl.
*G09G 5/00* (2006.01)
*G09G 5/38* (2006.01)

(52) U.S. Cl.
CPC .............. *G09G 5/38* (2013.01); *G09G 5/005* (2013.01); *G09G 2340/0492* (2013.01); *G09G 2354/00* (2013.01)

(58) Field of Classification Search
CPC ...... G09G 5/38; G09G 5/005; G09G 2354/00; G09G 2340/0492
See application file for complete search history.

(56) References Cited

U.S. PATENT DOCUMENTS

2004/0201595 A1* 10/2004 Manchester .......... G06F 1/1626
345/649
2010/0302278 A1* 12/2010 Shaffer ................. G06F 3/0481
345/659
(Continued)

FOREIGN PATENT DOCUMENTS

CN 102708358 A 10/2012
CN 102830793 A 12/2012
(Continued)

OTHER PUBLICATIONS

First Office Action issued in Chinese Application No. 201710494726.9, dated Aug. 13, 2019, with English translation.

*Primary Examiner* — Robert J Craddock
(74) *Attorney, Agent, or Firm* — McDermott Will & Emery LLP

(57) ABSTRACT

The present disclosure discloses a display device and a display method thereof. The display device includes: a display screen is configured to be switched between a landscape state and a portrait state; an information collection unit is configured to collect an image of a viewer; a sight concentration area determination unit is configured to determine a sight concentration area of the viewer before the display screen is switched between the landscape state and the portrait state; a to-be-displayed picture determination unit is configured to determine a to-be-displayed picture after the display screen is switched between the landscape state and the portrait state; and a central processing unit is configured to process the to-be-displayed picture, wherein the processed to-be-display picture may cover a whole display surface after the display screen is switched between the landscape state and the portrait state.

17 Claims, 10 Drawing Sheets

(56) References Cited

U.S. PATENT DOCUMENTS

| | | | | |
|---|---|---|---|---|
| 2013/0227469 A1* | 8/2013 | Park | ............... | G06F 3/0481 |
| | | | | 715/788 |
| 2014/0055747 A1* | 2/2014 | Nistico | ............... | A61B 3/14 |
| | | | | 351/206 |
| 2014/0279029 A1* | 9/2014 | Ma | ............... | G06Q 30/0267 |
| | | | | 705/14.64 |
| 2015/0199003 A1* | 7/2015 | Zhang | ............... | G06F 3/013 |
| | | | | 345/156 |
| 2016/0275649 A1* | 9/2016 | Yang | ............... | G06F 3/0487 |

FOREIGN PATENT DOCUMENTS

| | | | |
|---|---|---|---|
| CN | 103713821 A | 4/2014 | |
| CN | 105446673 A | 3/2016 | |
| CN | 105630135 A | 6/2016 | |

\* cited by examiner

DISPLAY DEVICE AND DISPLAY METHOD THEREOF

CROSS-REFERENCE TO RELATED APPLICATION

This application claims the priority of Chinese Patent Application No. 201710494726.9, filed on Jun. 26 2017, titled "Display Device and Display Method thereof", the entire content of which is incorporated by reference herein.

TECHNICAL FIELD

The present disclosure relates to the field of display technology, and more particularly, to a display device and a display method thereof.

BACKGROUND

The display device is a device for displaying a picture such as a character, a number, a symbol, or a photograph, or an image formed by combining at least two types of the character, the number, the symbol, and the photograph, and provides greater convenience for people's life and work.

Presently, the display device typically comprises a display screen for displaying the picture. The display screen may usually be rectangular, for example, the display screen may be a picture frame for displaying the photographs. In the display device, the display screen may be in a landscape state (the display screen is placed horizontally, and when the viewer views the middle area of the display screen, the long side of the display screen is parallel to a connection line between the left and right eyes of the viewer), or the display screen may also be in a portrait state (the display screen is placed vertically, and when the viewer views the middle area of the display screen, the short side of the display screen is parallel to the connection line between the left and right eyes of the viewer), and the display screen of the display device may be switched between the landscape state and the portrait state. However, after the display screen is switched between the landscape state and the portrait state, the picture displayed by the display screen usually shows the phenomenon of a black frame. For example, when the display screen is switched from the landscape state to the portrait state, a black area appears on the top and bottom sides of the displayed picture after the display screen is in the portrait state; or, after the display screen is switched from the portrait state to the landscape state, the black area appears on the left and right sides of the displayed picture after the display screen is in the landscape state.

SUMMARY

The present disclosure discloses the following technical solutions.

In one aspect, some embodiments of the present disclosure provide a display device. The display device comprises:

a display screen configured to display a picture and be switchable between a landscape state and a portrait state;

an information collector configured to collect an image of a viewer; and a processor connected to the display screen and the information collector, and configured to: determine a sight concentration area of the viewer when the viewer views a picture displayed on the display screen according to the image of the viewer before the display screen is switched between the landscape state and the portrait state; determine a to-be-displayed picture after the display screen is switched between the landscape state and the portrait state according to the sight concentration area of the viewer; and process the to-be-displayed picture, wherein the processed to-be-displayed picture may cover a whole display surface after the display screen is switched between the landscape state and the portrait state.

Optionally, the processor is configured to: calculate the distance between the left eye of the viewer and the display screen and the distance between the right eye of the viewer and the display screen respectively according to the image of the viewer before the display screen is switched between the landscape state and the portrait state when the display screen is in the landscape state, and determine the sight concentration area of the viewer when the viewer views the picture displayed on the display screen before the display screen is switched between the landscape state and the portrait state.

Optionally, the processor is configured to: calculate the distance between the forehead of the viewer and the display screen and the distance between the chin of the viewer and the display screen respectively according to the image of the viewer before the display screen is switched between the landscape state and the portrait state when the display screen is in the portrait state, and determine the sight concentration area of the viewer when the viewer views the picture displayed on the display screen before the display screen is switched between the landscape state and the portrait state.

Optionally, the to-be-displayed picture determined by the processor is a local picture in the picture displayed on the display screen before the display screen is switched between the landscape state and the portrait state according to the sight concentration area of the viewer.

Optionally, the processor is configured to: determine that the display screen is in the landscape state or the portrait state before the display screen is switched between the landscape state and the portrait state.

Optionally, the display device further comprises a timer, the timer is configured to: obtain a retention time of the sight concentration area of the viewer in the to-be-displayed picture. In this case, the processor is configured to: compare the retention time and a viewing time threshold, send the to-be-displayed picture to a cloud server when the retention time is greater than or equal to the viewing time threshold, wherein the cloud server is configured to determine a recommend picture according to the to-be-displayed picture; and obtain the recommend picture, and facilitate the display screen to display the recommend picture.

Optionally, the information collector is further configured to collect a gesture or a voice of a viewer. In this case, the processor is configured to: generate an operation instruction of the viewer to the picture displayed on the display screen according to the gesture or the voice of the viewer collected by the information collector; and facilitate the display screen to execute the operation instruction.

In another aspect, some embodiments of the present disclosure provide a display method of the display device described by the above technical solutions. The display method comprises:

collecting an image of a viewer;

determining a sight concentration area of the viewer when the viewer views a picture displayed on a display screen according to the image of the viewer before the display screen is switched between a landscape state and a portrait state;

determining a to-be-displayed picture according to the sight concentration area of the viewer after the display screen is switched between the landscape state and the portrait state; and processing the to-be-displayed picture, wherein the processed to-be-displayed picture may cover a whole display surface after the display screen is switched between the landscape state and the portrait state.

Optionally, the to-be-displayed picture is a local picture in the picture displayed before the display screen is switched between the landscape state and the portrait state.

Optionally, before the step of collecting the image of the viewer, the display method of the display device further comprises: determining that the display screen is in the landscape state or the portrait state before the display screen is switched between the landscape state and the portrait state.

Optionally, before the display screen is switched between the landscape state and the portrait state, when the display screen is in the landscape state, the step of determining a sight concentration area of the viewer when the viewer views an image displayed on the display screen according to the image of the viewer before the display screen is switched between the landscape state and the portrait state comprises:

calculating the distance between the left eye of the viewer and the display screen and the distance between the right eye of the viewer and the display screen respectively according to the image of the viewer; determining the spatial positions of the left eye and the right eye of the viewer respectively in front of the display screen according to the distance between the left eye of the viewer and the display screen and the distance between the right eye of the viewer and the display screen respectively; making a first connection line between the spatial position corresponding to the left eye of the viewer and the spatial position corresponding to the right eye of the viewer according to the spatial positions of the left eye and the right eye of the viewer respectively in front of the display screen, determining a midpoint of the first connection line; making a first straight line perpendicular to the first connection line via the midpoint of the first connection, wherein the intersection point between the first straight line and the display screen is the sight concentration area of the viewer;

or, calculating the distance between the left eye of the viewer and the display screen and the distance between the right eye of the viewer and the display screen respectively according to the image of the viewer; determining a first difference value according to the distance between the left eye of the viewer and the display screen and the distance between the right eye of the viewer and the display screen respectively, wherein the first difference value is the difference between the distance between the left eye of the viewer and the display screen and the distance between the right eye of the viewer and the display screen; obtaining a plurality of first difference value ranges, wherein each of the first difference value ranges corresponds to one local area in the display screen; comparing the first difference value with the plurality of the first difference value ranges, determining the first different value range in which the first difference value falls, wherein a local area corresponding to the first difference value range in which the first difference value falls is the sight concentration area of the viewer.

Optionally, before the display screen is switched between the landscape state and the portrait state, when the display screen is in the portrait state, the step of determining the sight concentration area of the viewer when the viewer views a picture displayed on the display screen according to the image of the viewer before the display screen is switched between the landscape state and the portrait state comprises:

calculating the distance between the forehead of the viewer and the display screen and the distance between the chin of the viewer and the display screen respectively according to the image of the viewer; determining the spatial positions of the forehead and chin of the viewer in front of the display screen according to the distance between the forehead of the viewer and the display screen and the distance between the chin of the viewer and the display screen respectively; making a second connection line between the spatial position corresponding to the forehead of the viewer and the spatial position corresponding to the chin of the viewer according to the spatial positions of the forehead and the chin of the viewer in front of the display screen, determining a midpoint of the second connection line; making a second straight line perpendicular to the second connecting line via the middle point of the second connection line, intersection point between the second straight line and the display screen is the sight concentration area of the viewer;

or, calculating the distance between the forehead of the viewer and the display screen and the distance between the chin of the viewer and the display screen respectively according to the image of the viewer; determining a second difference value according to the distance between the forehead of the viewer and the display screen and the distance between the chin of the viewer and the display screen respectively, wherein the second difference value is the difference between the distance between the forehead of the viewer and the display screen and the distance between the chin of the viewer and the display screen; obtaining a plurality of second difference value ranges, wherein each of the second difference value ranges corresponds to one local area in the display screen; comparing the second difference value with the plurality of the second difference value ranges, determining the second difference value range in which the second difference value falls, wherein a local area corresponding to the second difference range in which the second difference value falls is the sight concentration area of the viewer.

Optionally, the step of determining a to-be-displayed picture after the display screen is switched between the landscape state and the portrait state according to the sight concentration area of the viewer comprises:

dividing the display screen into a plurality of preset areas in the direction of a long side of the display screen; determining the preset area in which the sight concentration area of the viewer falls, wherein the picture corresponding to the preset area in which the sight concentration area of the viewer falls is the to-be-displayed picture;

or, obtaining an expanded area by expanding the sight concentration area of the viewer to the two sides thereof according to the aspect ratio of the display screen in the direction of the long side of the display screen, wherein the ratio of the width of the short side of the display screen to the expanded width of the expanded area matches the aspect ratio of the display screen, a picture corresponding to the expanded area is the to-be-displayed picture.

Optionally, after the step of processing the to-be-displayed picture, the display method of the display device further comprises: facilitating the display screen to be switched between the landscape state and the portrait state; and facilitating the display screen to display the processed to-be-displayed picture.

Optionally, after the step of processing the to-be-displayed picture, the display method of the display device further comprises: obtaining a retention time of the sight concentration area of the viewer in the to-be-displayed picture; comparing the retention time with a viewing time threshold; and sending the to-be-displayed picture to a cloud server when the retention time is greater than or equal to the viewing time threshold, wherein the cloud server determines the recommend picture according to the number of the respective to-be-displayed pictures.

Optionally, the display method of the display device further comprises: obtaining the recommend picture; and facilitating the display screen to display the recommend picture.

Optionally, the display method of the display device further comprises: obtaining a gesture or a voice of a viewer; generating an operation instruction of the viewer for the picture displayed on the display screen; and facilitating the display screen to execute the operation instruction.

In still another aspect, some embodiments of the present disclosure provide a computer-readable storage medium, comprising an instruction. When the instruction is executed by a computer, the computer executes the display method mentioned above.

In still another aspect, some embodiments of the present disclosure further provide a computer program product, comprising an instruction. When the instruction is executed by a computer, the computer executes the above display method.

BRIEF DESCRIPTION OF THE DRAWINGS

The drawings described herein are used to provide a further understanding of the disclosure and constitute a part of this disclosure. the exemplary embodiments of the present disclosure and the descriptions thereof are used to explain the disclosure and do not constitute improper limitations to the disclosure. In the drawings.

DETAILED DESCRIPTION

In order to further illustrate a display device and a display method thereof provided by embodiments of the present disclosure, the details are described below with reference to the accompanying drawings.

Figure 1:
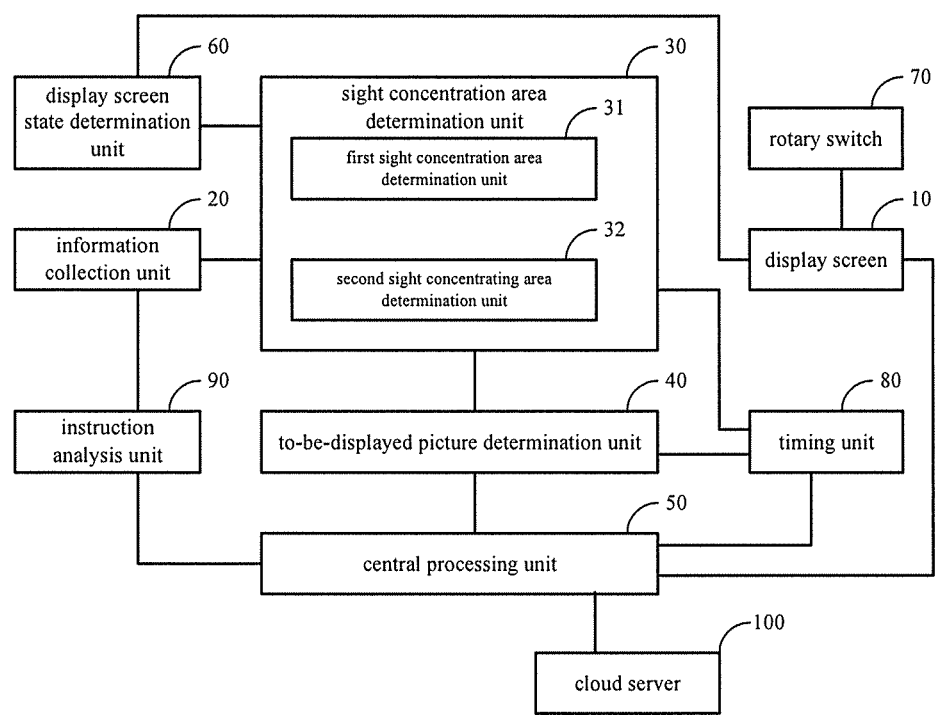
FIG. 1 is a structural diagram of a display device according to some embodiments of the present disclosure.

Referring to FIG. 1, some embodiments of the present disclosure provide a display device. The display device comprises a display screen 10, an information collection unit 20, a sight concentration area determination unit 30, a to-be-displayed picture determination unit 40, and a central processing unit 50.

The display screen 10 is configured to display a picture, and may be switched between a landscape state and a portrait state. The information collection unit 20 is configured to collect an image of a viewer. The sight concentration determination unit 30 is connected to the information collection unit 20 and configured to determine, before the display screen 10 is switched between the landscape state and the portrait state, a sight concentration area 14 of the viewer according to the image of the viewer when the viewer views the picture displayed on the display screen 10. The to-be-displayed picture determination unit 40 is connected to the sight concentration area determination unit 30 and configured to determine a to-be-displayed picture after the display screen 10 is switched between the landscape state and the portrait state based on the sight concentration area of the viewer determined by the sight concentration area determination unit 30. The central processing unit 50 is respectively connected to the to-be-displayed picture determination unit 40 and the display screen 10 and is configured to process the to-be-displayed picture, and the processed to-bedisplayed picture may cover a whole display surface after the display screen 10 is switched between the landscape state and the portrait state.

The display device provided by some embodiments of the present disclosure may be used in a mobile terminal product such as a mobile phone and a tablet computer, or, the display device provided by some embodiments of the present disclosure may also be used as a picture frame, a television or the like mounted on a wall surface for displaying the picture. In some embodiments of the present disclosure, the display device provided by some embodiments of the present disclosure is described as an example of the picture frame mounted on the wall surface for displaying the picture.

In some embodiments of the present disclosure, the display device comprises the display screen 10, the information collection unit 20, the sight concentration area determination unit 30, the to-be-determined determination unit 40 and the central processing unit 50. The display screen 10 is configured to display the picture, and is rectangular. The display screen 10 may be rotated freely, for example, the display screen may be in the landscape state or the portrait state.

For example, when the display screen 10 is placed in a horizontal state, both eyes of the viewer are located directly in front of the display screen 10; when the viewer views the middle area of the display screen 10, the long side of the display screen 10 is parallel to a connection line between the left eye and the right eye of the viewer, and the short side of the display screen 10 is parallel to a connection line between the forehead and the chin of the viewer.

For example, when the display screen 10 is in the portrait state, the display screen 10 is placed vertically, both eyes of the viewer are located directly in front of the display screen 10; when the viewer views the middle area of the display screen 10, the short side of the display screen 10 is parallel to the connection line between the left and right eyes of the viewer, and the long side of the display screen 10 is parallel to the connection line between the forehead and the chin of the viewer.

According to the viewing posture of the viewer, the display screen may be rotated at different angles, such as 20°, 30°, 40°, 50°, 60°, 70° or 80°. Exemplarily, the display screen 10 may also be switched between the landscape state and the portrait state. That is, the display screen 10 may be switched from the landscape state to the portrait state, or the display screen 10 may be switched from the portrait state to the landscape state. During practical implementation, the display screen 10 may be rotated by 90° to realize the switch of the display screen 10 between the landscape state and the portrait state.

The information collection unit 20 may be provided on an outer frame of the display screen 10. The information collection unit 20 comprises a camera for collecting the image of the viewer.

The sight concentration area determination unit 30 is connected to the information collection unit 20 and configured to determine, before the display screen 10 is switched between the landscape state and the portrait state, the sight concentration area of the viewer according to the image of the viewer collected by the information collection unit 20 when the viewer views the picture displayed on the display screen 10.

The to-be-displayed picture determination unit 40 is connected to the sight concentration area determination unit 30 and configured to determine the to-be-displayed picture after the display screen 10 is switched between the landscape state and the portrait state according to the sight concentration area of the viewer determined by the sight concentration area determination unit 30, the to-be-displayed picture is a picture in a local area of the picture displayed before the display screen 10 is switched between the landscape state and the portrait state.

The central processing unit 50 is respectively connected to the to-be-displayed picture determination unit 40 and the display screen 10 and configured to process the to-be-displayed picture. For example, the to-be-displayed picture is stretched, enlarged, modified and the like. The processed to-be-displayed picture may cover the whole display surface of the display screen 10 after the display screen is switched between the landscape state and the portrait state, so as to avoid the phenomenon that a black frame appears on the picture displayed after the display screen 10 is switched between the landscape state and the portrait state.

It may be seen from the above that, the display device provided by some embodiments of the present disclosure utilize the information collection unit 20 to collect the image of the viewer; then utilize the sight concentration determination unit 30 to determine, before the display screen is switched between the landscape state and the portrait state, the sight concentration area of the viewer when the viewer views the picture displayed on the display screen 10; then utilize the to-be-displayed picture determination unit 40 to determine the to-be-displayed picture after the display screen 10 is switched between the landscape state and the portrait state according to the sight concentration area of the viewer; then utilize the central processing unit 50 to process the to-be-displayed picture, and cause the processed to-be-displayed picture to be able to match the state in which the display screen 10 is after the display screen 10 is switched between the landscape state and the portrait state, that is, the processed to-be-displayed picture may cover the whole display surface after the display screen 10 is switched between the landscape state and the portrait state. Therefore, after the display screen 10 is switched between the landscape state and the portrait state, the display screen 10 displays the processed to-be-displayed picture under the indication of the central processing unit 50. The processed to-be-displayed picture may cover the whole display surface of the display screen 10, and a black area may not appear on the edge of the display surface of the display screen 10. That is to say, after the display screen 10 is switched between the landscape state and the portrait state, the phenomenon of the black frame may not appear on the picture displayed by the display screen 10.

In addition, in the display device provided by some embodiments of the present disclosure, the to-be-displayed picture determination unit 40 determines that the to-be-displayed picture is actually the picture of a local area of the picture displayed before the display screen 10 is switched between the landscape state and the portrait state according to the sight concentration area of the viewer determined by the sight concentration area determination unit 30. As the picture displayed after the display screen is switched between the landscape state and the portrait state is the processed picture of the local area, it is convenient for the viewer to view an enlarged view of the picture of the area which he/she interests, so as to facilitate the viewer to view the details of the picture in the area of his/her interest and improve the viewing experience of the viewer.

In some embodiments, the operation that the sight concentration area determination unit 30 determines the sight concentration area of the viewer according to the image of the viewer is as follows: before the display screen 10 is switched between the landscape state and the portrait state, if the display screen 10 is in the landscape state, the sight concentration area determination unit 30 may calculate the distance between the left eye of the viewer and the display screen 10 and the distance between the right eye of the viewer and the display screen 10 respectively according to the image of the viewer. And the sight concentration area determination unit 30 determines the sight concentration area of the viewer when the viewer views the picture displayed on the display screen 10 according to the distance between the left eye of the viewer and the display screen 10 and the distance between the right eye of the viewer and the display screen 10 respectively before the display screen 10 is switched between the landscape state and the portrait state.

Or, before the display screen 10 is switched between the landscape state and the portrait state, if the display screen 10 is in the portrait state, the sight concentration area determination unit 30 may calculate the distance between the forehead of the viewer and the display screen 10 and the distance between the chin of the viewer and the display screen 10 respectively according to the image of the viewer. And the sight concentration area determination unit 30 determines the sight concentration area of the viewer when the viewer views the picture displayed on the display screen 10 according to the distance between the forehead and the display screen 10 and the distance between the chin of the viewer and the display screen respectively before the display screen is switched between the landscape state and the portrait state.

Figure 15:
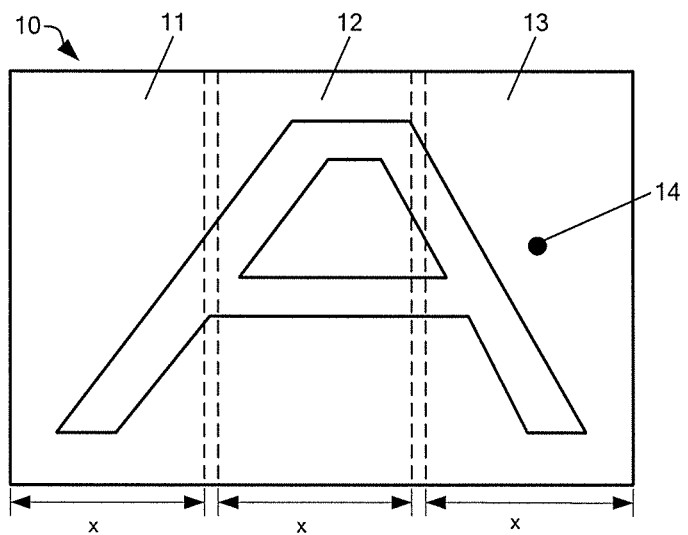
FIG. 15 is Diagram 1 of determining a to-be-displayed picture before a display screen is switched from a landscape state to a portrait state.
Figure 16:
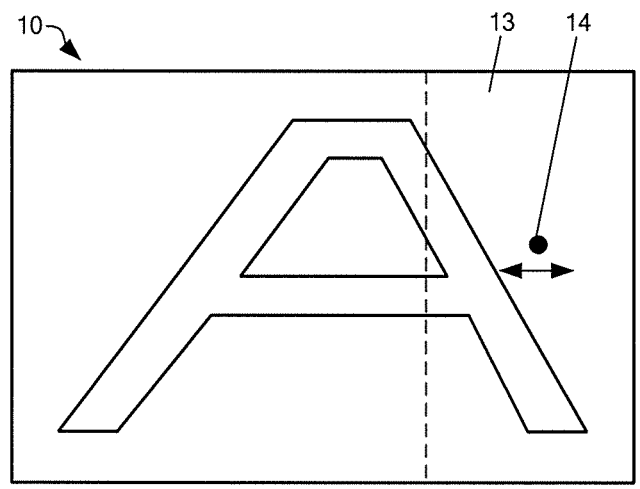
FIG. 16 is Diagram 2 of determining a to-be-displayed picture before a display screen is switched from a landscape state to a portrait state.
Figure 17:
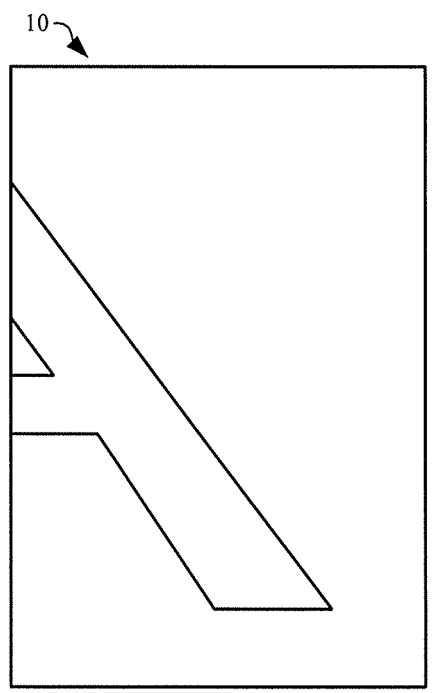
FIG. 17 is a diagram for displaying the to-be-displayed picture in FIG. 15 or FIG. 16 after a display screen is switched from a landscape state to a portrait state.

FIG. 15, FIG. 16 and FIG. 17 show a process of the display screen 10 being switched from the landscape state to the portrait state. The picture displayed by the display screen 10 in the landscape state is as shown in FIG. 15 or FIG. 16. In FIG. 15, the display screen in the landscape state is divided into 3 preset areas (that is, 3 local areas) 11, 12 and 13. There are several rules to divide the display screen, such as an equal division, a proration division and so on. And the amount of the preset areas is not limited to 3, also may be 2, 4 or 5; as long as the aspect ratio (that is, the length-width ratio) of each preset area 11, 12 or 13 is satisfied with that of the display screen. That is, as shown in FIG. 16, the width of the display screen:the distance of x=the length of the display screen:the width of the display screen. It should be noted that, it will not influence the display in the portrait state of the picture in the preset area 11, 12 or 13 in spite that there is a gap or an overlap between the two adjacent preset areas.

Figure 11:
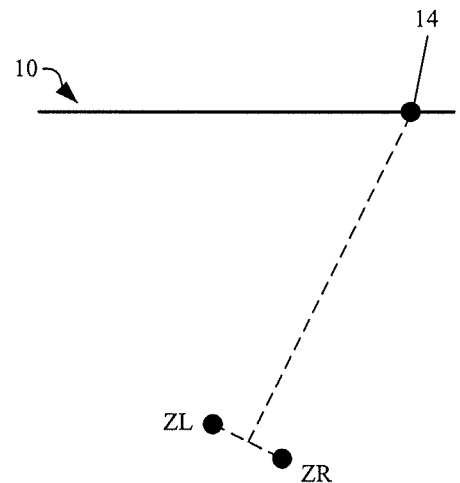
FIG. 11 is Diagram 1 of determining a sight concentration area of a viewer before a display screen is switched from a landscape state to a portrait state.
Figure 12:
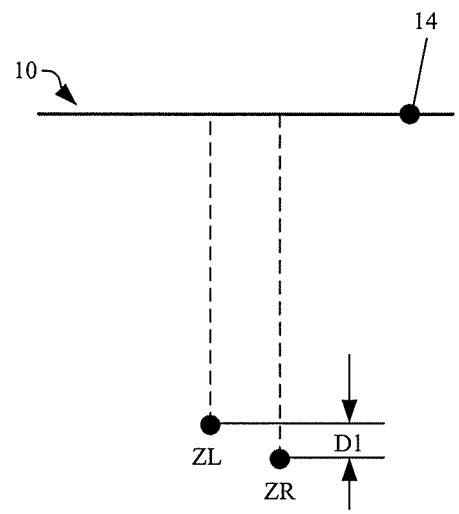
FIG. 12 is Diagram 2 of determining a sight concentration area of a viewer before a display screen is switched from a landscape state to a portrait state.

Referring to FIG. 11 and FIG. 12, the information collection unit 20 collects the image of the viewer and sends the image to the sight concentration area determination unit 30. The sight concentration determination unit 30 then calculates the distance between the left eye ZL of the viewer and the display screen 10 and the distance between the right eye ZR of the viewer and the display screen 10 respectively according to the image of the viewer collected by the information collection unit 20. Further, according to the distance between the left eye ZL of the viewer and the display screen 10 and the distance of the right eye ZR of the viewer and the display screen 10 respectively, the sight concentration area determination unit 30 determines the sight concentration area 14 of the viewer in the picture displayed before the display screen is switched to the portrait state on the display screen 10. That is, the sight concentration area determination unit 30 determines the sight concentration area 14 of the viewer when the viewer views the picture displayed on the display screen 10 which is in the landscape state (as shown in FIG. 15 or 16), and transmits the position information of the sight concentration area 14 of the viewer to the to-be-displayed picture determination unit 40. The to-be-displayed picture determination unit 40 determines the to-be-displayed picture after the display screen 10 is switched to the portrait state according to the sight concentration area 14 of the viewer and transmits the to-be-displayed picture to the central processing unit 50. For example, the picture in the preset area 13 is determined as the to-be-displayed picture. The central processing unit 50 processes the to-be-displayed picture and matches the processed to-be-displayed picture with the display screen 10 after the display screen is switched from the landscape state to the portrait state, so that the processed to-be-displayed picture may cover the whole display surface when the display screen 10 is in the portrait state. Referring to FIG. 17, after the display screen 10 is switched from the landscape state to the portrait state, the display screen 10 displays the processed to-be-displayed picture. Exemplarily, the displayed picture is the picture corresponding to the preset area 13 in FIG. 15 or FIG. 16. After the display screen 10 is switched from the landscape state to the portrait state, the display screen 10 is in the portrait state, as shown in FIG. 17, the display screen 10 displays the processed to-be-displayed picture, and the processed to-be-displayed picture covers the whole display surface when the display screen 10 is in the portrait state.

Figure 18:
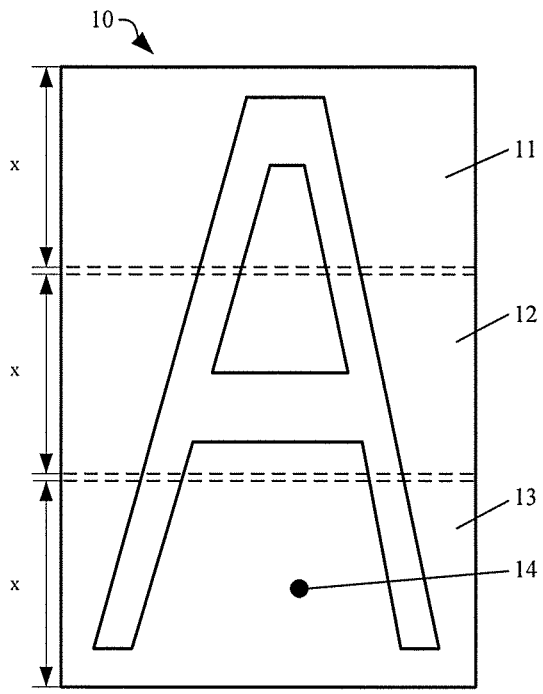
FIG. 18 is Diagram 1 of determining a to-be-displayed picture before a display screen is switched from a portrait state to a landscape state.
Figure 19:
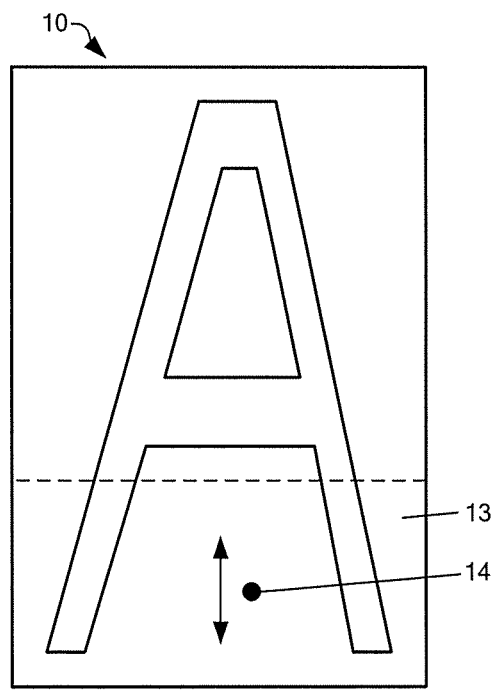
FIG. 19 is Diagram 2 of determining a to-be-displayed picture before a display screen is switched from a portrait state to a landscape state.
Figure 20:
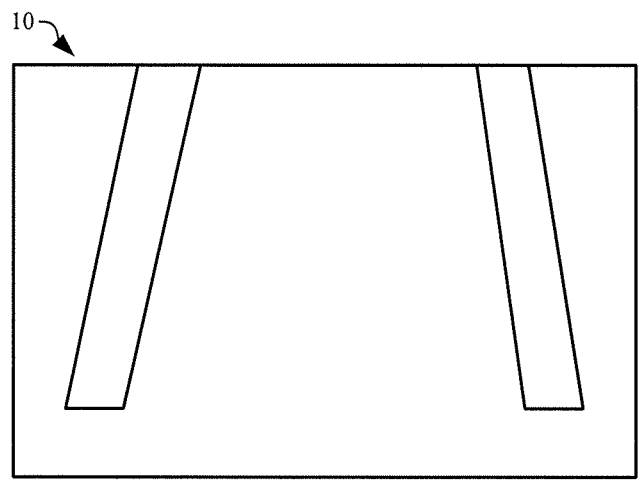
FIG. 20 is a diagram for displaying the to-be-displayed picture in FIG. 18 or FIG. 19 after a display screen is switched from a portrait state to a landscape state.

FIG. 18, FIG. 19 and FIG. 20 show a process in which the display screen 10 is switched from the portrait state to the landscape state. The picture displayed on the display screen 10 in the portrait state is as shown in FIG. 18 or FIG. 19. In FIG. 18, the display screen in the portrait state is divided into 3 preset areas 11, 12 and 13 (that is, 3 local areas). There are several rules to divide the display screen, such as an equal division, a proration division and so on. And the amount of the preset areas is not limited to 3, also may be 2, 4 or 5; as long as the aspect ratio (that is, the length-width ratio) of each preset area 11, 12 or 13 is satisfied with that of the display screen. That is, as shown in FIG. 18, the width of the display screen:the distance of x=the length of the display screen:the width of the display screen. It should be noted that, it will not influence the display in the landscape state of the picture in the preset area 11, 12 or 13 in spite that there is a gap or an overlap between the two adjacent preset areas.

Figure 13:
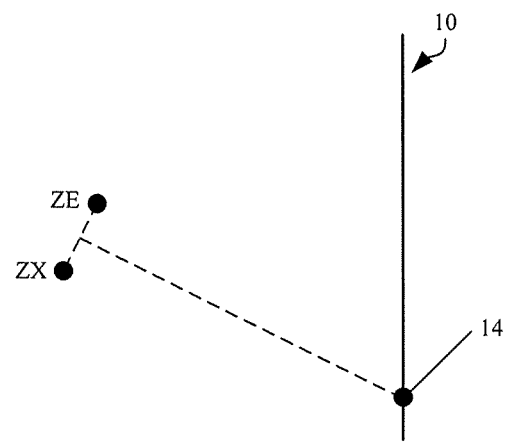
FIG. 13 is Diagram 1 of determining a sight concentration area of a viewer before a display screen is switched from a portrait state to a landscape state.
Figure 14:
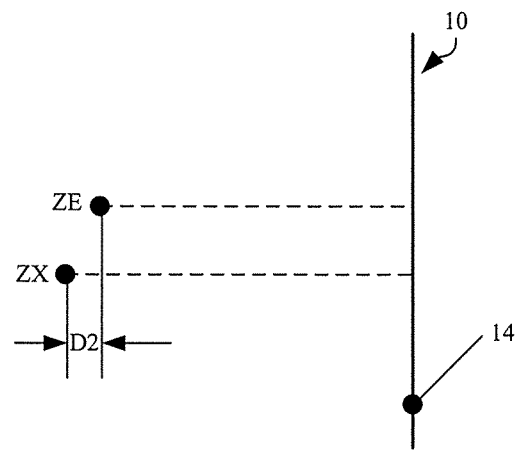
FIG. 14 is Diagram 2 of determining a sight concentration area of a viewer before a display screen is switched from a portrait state to a landscape state.

Referring to FIG. 13 and FIG. 14, the information collection unit 20 collects the image of the viewer and transmits the image to the sight concentration area determination unit 30. The sight concentration area determination unit 30 then calculates the distance between the forehead ZE of the viewer and the display screen 10 and the distance between the chin ZX of the viewer and the display screen 10 respectively according to the image of the viewer collected by the information collection unit 20. Further, according to the distance between the forehead ZE of the viewer and the display screen 10 and the distance between the chin ZX of the viewer and the display screen 10 respectively, the sight concentration area determination unit 30 determines the sight concentration area 14 of the viewer in the picture displayed before the display screen is switched to the landscape state on the display screen 10. That is, the sight concentration area determination unit 30 determines the sight concentration area 14 of the viewer when the viewer views the picture displayed on the display screen 10 which is in the portrait state (shown in FIG. 18 or FIG. 19), and transmits the location information of the sight concentration area 14 of the viewer to the to-be-displayed picture determination unit 40. The to-be-displayed picture determination unit 40 determines the to-be-displayed picture after the display screen is switched to the landscape state according to the sight concentration area 14 of the viewer, and transmits the to-be-displayed picture to the central processing unit 50. For example, the picture in the preset area 13 is determined as the to-be-displayed picture. The central processing unit 50 processes the to-be-displayed picture and matches the processed to-be-displayed picture with the display screen 10 after the display screen is switched from the portrait state to the landscape state, so that the processed to-be-displayed picture may cover the whole display surface when the display screen 10 is in the landscape state. After the display screen 10 is switched from the portrait state to the landscape state, the display screen 10 displays the processed to-be-displayed picture. Exemplarily, the displayed picture is the picture corresponding to the preset area 13 in FIG. 18 or FIG. 19. After the display screen 10 is switched from the portrait state to the landscape state, the display screen 10 is in the landscape state, as shown in FIG. 20, the display screen 10 displays the processed to-be-displayed picture, and the processed to-be-displayed picture may cover the whole display screen when the display screen 10 is in the landscape state.

In some embodiments, in the operation that the sight concentration area determination unit 30 determines the sight concentration area of the viewer when the viewer views the picture displayed on the display screen 10 before the display screen is switched between the landscape state and the portrait state, the information of the distances calculated by the sight concentration area determination unit 30 according to the image of the viewer is different when the display screen 10 is switched from the landscape state to the portrait state and when the display screen 10 is switched from the portrait state to the landscape state. Please refer to FIG. 1, in some embodiments of the present disclosure, the sight concentration area determination unit 30 comprises a first sight concentration area determination unit 31 and a second sight concentration area determination unit 32, the first sight concentration area determination unit 31 and the second sight concentration area determination unit 32 are connected to the information collection unit 20, respectively. When the display screen 10 is switched from the landscape state to the portrait state, the first sight concentration area determination unit 31 calculates the distance between the left eye of the viewer and the display screen 10 and the distance between the right eye of the viewer and the display screen 10 respectively according to the image of the viewer, and determines the sight concentration area of the viewer when the viewer views the picture displayed on the display screen 10 before the display screen is switched between the landscape state and the portrait state. When the display screen 10 is switched from the portrait state to the landscape state, the first sight concentration area determination unit 31 calculates the distance between the forehead of the viewer and the display screen 10 and the distance between the chin of the viewer and the display screen 10 respectively according to the image of the viewer, and determines the sight concentration area of the viewer when the viewer views the picture displayed on the display screen 10 before the display screen is switched between the landscape state and the portrait state. In this way, interference may be prevented between the display screen 10 being switched from the landscape state to the portrait state and the display screen 10 being switched from the portrait state to the landscape state.

With reference to FIG. 1, the display device provided by some embodiments of the present disclosure further comprises a display screen state determination unit 60. The display screen state determination unit 60 is connected to the display screen 10 and the sight concentration area determination unit 30, respectively. The display screen state determination unit 60 is configured to determine that the display screen 10 is in the landscape state or the portrait state before the display screen 10 is switched between the landscape state and the portrait state. In the practical implementation, the display screen state determination unit 60 firstly determines the state of the display screen 10 before the display screen is switched between the landscape state and the portrait state. For example, the display screen state determination unit 60 determines whether the display screen 10 is in the landscape state or the portrait state before the display screen is switched between the landscape state and the portrait state. When the display screen state determination unit 60 determines that the display screen 10 is in the landscape state, the first sight concentration determination unit 31 in the sight concentration area determination unit 30 is activated, so that the first sight concentration area determination unit 31 calculates the distance between the left eye of the viewer and the display screen 10 and the distance between the right eye of the viewer and the display screen 10 respectively according to the image of the viewer, and determines the sight concentration area of the viewer. When the display screen state determination unit 60 determines that the display screen 10 is in the portrait state, the second sight concentration determination unit 32 in the sight concentration area determination unit 30 is activated, so that the second sight concentration area determination unit 32 calculates the distance between the forehead of the viewer and the display screen 10 and the distance between the chin of the viewer and the display screen 10 respectively according to the image of the viewer, and determines the sight concentration area of the viewer.

The setting of the display screen state determination unit 60 may instruct the sight concentration area determination unit 30, may prevent the first sight concentration area determination unit 31 and the second sight area concentration area determination unit 32 in the sight concentration area determination unit 30 from simultaneously determining the sight concentration area of the viewer, and prevents the display screen 10 from failing when the display screen displays the to-be-displayed picture after the display screen 10 is switched between the landscape state and the portrait state.

The display device provided in some embodiments of the present disclosure may be the picture frame mounted on a wall surface for displaying the picture. In this case, when the display screen 10 needs to be switched between the landscape state and the portrait state, the display screen 10 may be manually rotated by the viewer to switch the display screen 10 between the landscape state and the portrait state. Or in some embodiments of the present disclosure, as shown in FIG. 1, the display device further comprises a rotary switch 70, and the rotary switch 70 is connected to the display screen 10. When it is desired to switch the display screen 10 between the landscape state and the portrait state, the rotary switch 70 is triggered to switch the display screen 10 between the landscape state and the portrait state. The setting of the rotary switch 70 may facilitate the display screen 10 to automatically switch between the landscape state and the portrait state.

With reference to FIG. 1, the display device provided by some embodiments of the present disclosure further comprises a timing unit 80, and the timing unit 80 is connected to the sight concentration area determination unit 30, the to-be-displayed picture determination unit 40, and the central processing unit 50, respectively. The timing unit 80 is configured to obtain the retention time of the sight concentration area of the viewer in the to-be-displayed picture. The central processing unit 50 is further configured to compare the retention time with the viewing time threshold and send the to-be-displayed picture to a cloud server 100 when the retention time is greater than or equal to the viewing time threshold. The cloud server 100 determines the recommend picture according to the to-be-displayed picture. The central processing unit 50 is further configured to obtain the recommend picture and cause the display screen 10 to display the recommend picture.

In the practical implementation, the timing unit 80 is utilized to obtain the retention time of the sight concentration area of the viewer in the to-be-displayed picture. The central processing unit 50 is utilized to compare the retention time with the viewing time threshold. When the retention time is greater than or equal to the viewing time threshold, the central processing unit 50 sends the corresponding to-be-displayed picture to the cloud server 100. The cloud server 100 performs statistical processing on the to-be-displayed pictures, determines the to-be-displayed picture with the maximum amount, and determines that the to-be-displayed picture with the maximum amount as the recommended display image. When the display screen 10 fails to obtain the to-be-displayed picture before the display screen is switched between the landscape state and the portrait state, or when the viewer requests to display other picture in which the viewer interests, or when the viewer requests to display the picture what the viewer is accustomed to watch, the central processing unit 50 obtains the recommend picture from the cloud server 100 and causes the display screen 10 to display the recommend picture. It is also considered the recommend picture obtained by the central processing unit 50 as the to-be-displayed picture, so that the recommend picture is displayed on the display screen 10.

With reference to FIG. 1, the display device provided by some embodiments of the present disclosure further comprises an instruction analysis unit 90, and the instruction analysis unit 90 is connected to the information collection unit 20 and the central processing unit 50 respectively. The information collection unit 20 is also configured to collect the gesture or the voice of the viewer. The instruction analysis unit 90 is configured to generate an operation instruction of the viewer to the picture displayed on the display screen 10 according to the gesture or the voice of the viewer collected by the information collection unit 20. The central processing unit 50 is further configured to facilitate the display screen 10 to execute the operation instruction. In the practical implementation, the information collection unit 20 collects the gesture or the voice of the viewer, and the instruction analysis unit 91 generates the operation instruction of the viewer to the picture displayed on the display screen 10 according to the gesture or the voice of the viewer. For example, the operation instruction may be the displaying of the to-be-displayed picture being exited, or a picture other than the to-be-displayed picture being demanded to display, or the display screen 10 being facilitated to be switched between the landscape state and the portrait state, and so on. The central processing unit 50 facilitates the display screen 10 to execute the corresponding operation instruction.

It may be understood that the function performed by each functional unit in the above embodiments may be a specific functional module or a specific functional unit divided from a processor or a controller. For example, the processor may be divided into multiple functional modules or functional units corresponding to each function, and may also integrate two or more functions above into one functional module or functional unit. The above functional module or functional unit may be realized by not only a hardware form but also a software form. It should be noted that the division of the functional modules or the functional units in the embodiments of the present disclosure is exemplary, and is merely a division of the logical functions. And there may be other division manners in the practical implementation.

Figure 21:
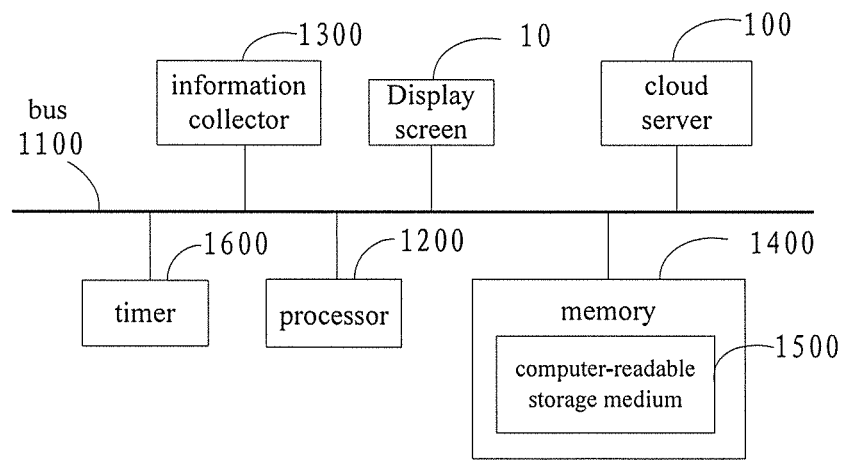
FIG. 21 is a structural diagram of a display device according to some embodiments of the present disclosure.

Corresponding to the embodiments with the above functional units, some embodiments of the present disclosure further provide another display device. Referring to FIG. 21, the display device comprises a display screen 10, an information collector 1300 and a processor 1200.

The display screen 10 is configured to display a picture. The display screen 10 may be switched between the landscape state and the portrait state. The display screen may be, for example, an LED display, an OLED display, an LCD or the like. The information collector 1300 is configured to collect an image of a viewer. For example, the information collector 1300 may realize the corresponding functions of the information collection unit 20 shown in FIG. 1. Specifically, the information collector may be a device that may collect the image of the viewer, such as a camera, a video camera, a depth camera, or the like.

The processor 1200 is connected to the display screen 10 and the information collector 1300. The processor 1200 corresponds to one or more of the functional units in the foregoing embodiments, for example, the sight concentration area determination unit 30, the first sight concentration area determination unit 31, the second sight concentrating area determination unit 32, the to-be-displayed picture determination unit 40, the central processing unit 50, the display screen state determination unit 60 and the instruction analysis unit 90, and executes the functions corresponding to these units.

For example, the processor 1200 is configured to determine the sight concentration area of the viewer when the viewer views the picture displayed on the display screen according to the image of the viewer before the display screen is switched between the landscape state and the portrait state; to determine a to-be-displayed picture after the display screen is switched between a landscape state and a portrait state according to the sight concentration area of the viewer; and to process the to-be-displayed picture, the processed to-be-displayed picture may cover a whole display surface of the display screen after the display screen is switched between the landscape state and the portrait state.

The processor 1200 may be, for example, a central processing unit, a general purpose processor, a digital signal processor, an application specific integrated circuit, a field programmable gate array, other programmable logic components, a transistor logic component, a hardware component, or any combination thereof. The processor may realize or perform various exemplary logic blocks, modules, units and circuits described by reference to the contents disclosed by the present application. The processor may also implement a combination of one or more functions, for example, the combination comprising one or more microprocessor, and the like.

In the display device provided by some embodiments of the present disclosure, an image of a viewer is collected by using the information collector 1300. Then, the processor 1200 is utilized to determine the sight concentration area of the viewer when the viewer views the picture displayed on the display screen 10 before the display screen is switched between the landscape state and the portrait state. Then, the processor 1200 determines a to-be-displayed picture after the display screen 10 is switched between the landscape state and the portrait state according to the sight concentration area of the viewer. After that, the processor 1200 processes the to-be-displayed picture so that the processed to-be-displayed picture is matched with the state of the display screen 10 after the display screen 10 is switched between the landscape state and the portrait state. The processed to-be-displayed picture may cover the whole display surface of the display screen 10. After the display screen 10 is switched between the landscape state and the portrait state, the display screen 10 displays the processed to-be-displayed picture under the instruction of the processor 1200, and the processed to-be-displayed picture may cover the whole display surface of the display screen 10. In this way, no black area appears at the edge of the display surface of the display screen 10. That is, after the display screen 10 is switched between the landscape state and the portrait state, no black frame appears on the picture displayed on the display screen 10.

In some embodiments of the present disclosure, as shown in FIG. 21, the display device may further comprise a bus 1100, a timer 1600, a memory 1400, and the like. The bus 1100 may be an Extended Industry Standard Architecture (EISA) bus or the like. The bus 1100 may be classified as an address bus, a data bus, a control bus, and the like. For convenient illustration, only one bold line is shown in FIG. 21. However, this does not mean that only one bus or one type of bus is provided.

In some embodiments of the present disclosure, as shown in FIG. 21, the display device may further comprise the memory 1400. The memory 1400 in turn comprises a computer-readable storage medium 1500 for storing computer-readable instructions.

In some embodiments provided by the present disclosure, as shown in FIG. 21, the display device may further comprise the timer 1600 and a cloud server 100. The timer 1600 is configured to obtain a retention time of the sight concentration area of the viewer in the to-be-displayed picture. Then, the processor 1200 compares the retention time with a viewing time threshold and sends the to-be-displayed picture to the cloud server 100 when the retention time is greater than or equal to the viewing time threshold. The cloud server 100 determines a recommend picture according to the to-be-displayed picture. Then, the processor 1200 obtains the recommend picture and facilitates the display screen 10 to display the recommend picture.

Figure 2:
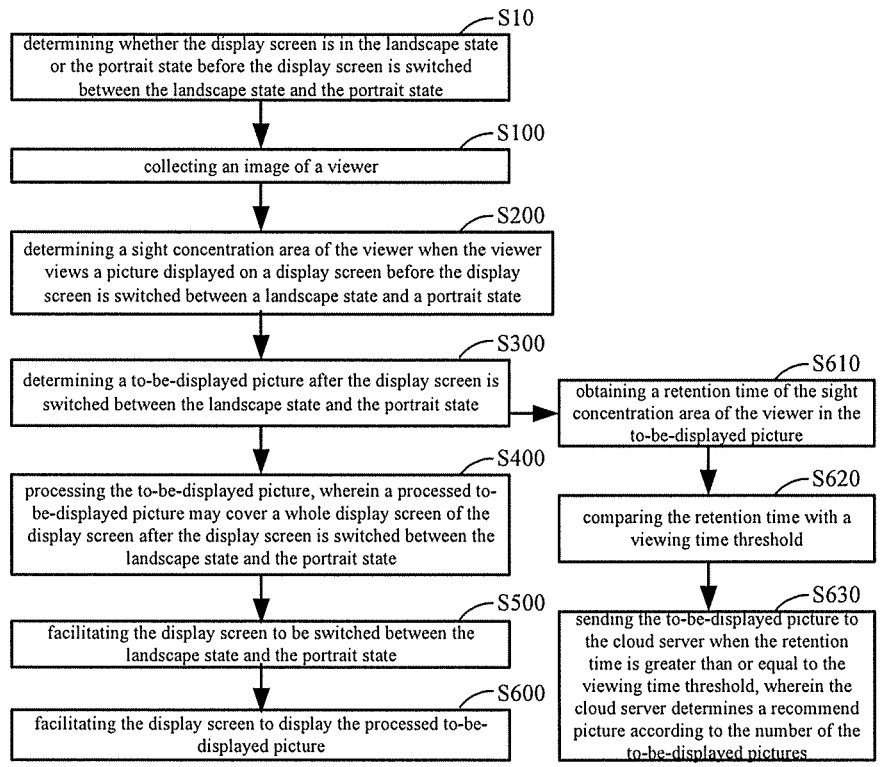
FIG. 2 is a flow chart of a display method of a display device according to some embodiments of the present disclosure.

Some embodiments of the present disclosure further provide a display method of a display device, which is applied to the display device as described in the above embodiments. Referring to FIG. 2, the display method of the display device comprises the following steps S100~S400.

S100: collecting an image of a viewer.

S200: determining a sight concentration area of the viewer when the viewer views a picture displayed on a display screen according to the image of the viewer before the display screen is switched between a landscape state and a portrait state.

S300: determining a to-be-displayed picture after the display screen is switched between the landscape state and the portrait state according to the sight concentration area of the viewer.

S400: processing the to-be-displayed picture, wherein a processed to-be-displayed picture may cover a whole display screen of the display screen after the display screen is switched between the landscape state and the portrait state.

In the practical implementation, the image of the viewer is firstly collected through an information collection unit; then, the sight concentration area of the viewer when the viewer views the picture displayed on the display screen according to the image of the viewer before the display screen is switched between the landscape state and the portrait state is determined by a sight concentration area determination unit; then, the to-be-displayed picture after the display screen is switched between the landscape state and the portrait state according to the sight concentration area of the viewer is determined by a to-be-displayed picture determination unit; then, the to-be-displayed picture is processed by a central processing unit, for example, the to-be-displayed picture is stretched, enlarged, modified and the like, and the processed to-be-displayed picture may cover the whole display surface of the display screen after the display screen is switched between the landscape state and the portrait state. After the screen is switched between the landscape state and the portrait state, no black area appears at the edge of the display screen when the display screen shows the processed to-be-displayed picture.

The various display methods in the embodiments in this description are described in a progressive manner, and the same or similar parts among the various display methods may refer to each other, each display method focuses on the differences from the other display methods. In particularly, the display methods are described in a relatively simple manner because the display methods are basically similar to the display devices, and for the relevant parts between them, please refer to the description of the display devices.

Please refer to FIG. 2, in some embodiments of the disclosure, before the step of S100, the display method of the display device further comprises:

S10: determining whether the display screen is in the landscape state or the portrait state before the display screen is switched between the landscape state and the portrait state.

In the practical implementation, whether the display screen is in the landscape state or the portrait state before the display screen is switched between the landscape state and the portrait state is determined by a display screen state determination unit. When the display screen state determination unit determines that the display screen is in the landscape state before the display screen is switched between the landscape state and the portrait state, a first sight concentration determination unit in the sight concentration area determination unit calculates the distance between the left eye of the viewer and the display screen and the distance between the right eye of the viewer and the display screen respectively, and determines the sight concentration area of the viewer. When the display screen state determination unit determines that the display screen is in the portrait state before the display screen is switched between the landscape state and the portrait state, a second sight concentration determination unit in the sight concentration area determination unit calculates the distance between the forehead of the viewer and the display screen and the distance between the chin of the viewer and the display screen respectively, and determines the sight concentration area of the viewer.

Figure 3:
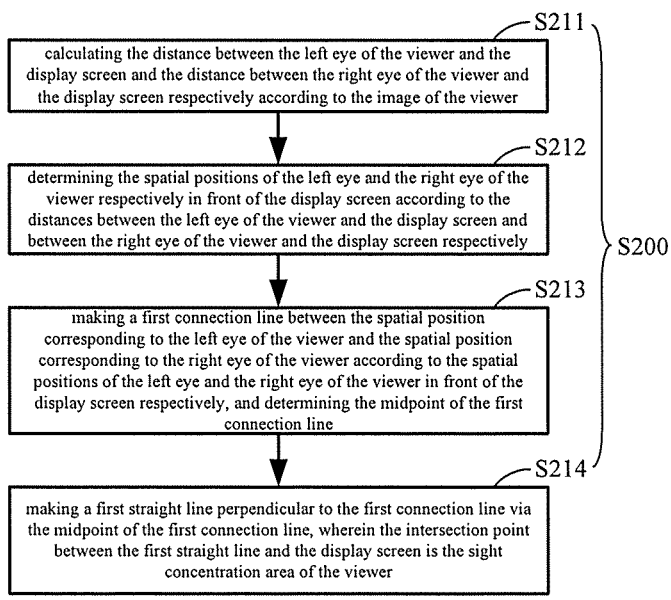
FIG. 3 is Flowchart 1 of Step S200 in FIG. 2 when a display screen is switched from a landscape state to a portrait state.

In some embodiments, before the display screen is switched between the landscape state and the portrait state, when the display screen is in the landscape state, referring to FIG. 3, the step of S200 may comprise the following steps.

S211: calculating the distance between the left eye of the viewer and the display screen and the distance between the right eye of the viewer and the display screen respectively according to the image of the viewer.

S212: determining the spatial positions of the left eye and the right eye of the viewer respectively in front of the display screen according to the distances between the left eye of the viewer and the display screen and between the right eye of the viewer and the display screen respectively.

S213: making a first connection line between the spatial position corresponding to the left eye of the viewer and the spatial position corresponding to the right eye of the viewer according to the spatial positions of the left eye and the right eye of the viewer in front of the display screen respectively, and determining the midpoint of the first connection line.

S214: making a first straight line perpendicular to the first connection line via the midpoint of the first connection line, wherein the intersection point between the first straight line and the display screen is the sight concentration area of the viewer.

Referring to FIG. 3 and FIG. 11, the first sight concentration area determination unit firstly calculates the distances between the left eye ZL of the viewer and the display screen 10 and between the right eye ZR of the viewer and the display screen 10 respectively according to the image of the viewer, and then determines the spatial positions of the left eye ZL and right eye ZR of the viewer in front of the display screen 10 according to the distances between the left eye ZL of the viewer and the display screen 10 and between the right eye ZR of the viewer and the display screen 10 respectively. Then the first connection line between the spatial position corresponding to the left eye ZL of the viewer and the spatial position corresponding to the right eye ZR of the viewer is made and the midpoint of the first connection line is determined. And then the first straight line perpendicular to the first connection line is made via the midpoint of the first connection line, the intersection point between the first straight line and the display screen 10 is determined as the sight concentration area 14 of the viewer.

In some embodiments, before the display screen is switched between the landscape state and the portrait state, when the display screen is in the landscape state, other ways may also be adopted to determine the view concentration area of the viewer. For example, referring to FIG. 4, the step of S200 may comprise the following steps.

S211: calculating the distance between the left eye of the viewer and the display screen and the distance between the right eye of the viewer and the display screen respectively according to the image of the viewer.

S222: determining a first difference value according to the distances between the left eye of the viewer and the display screen and between the right eye of the viewer and the display screen respectively, wherein the first difference value is the difference between the distance between the left eye of the viewer and the display screen and the distance between the right eye of the viewer and the display screen.

S223: obtaining a plurality of first difference value ranges, wherein each first difference value range corresponds to one local area in the display screen.

S224: comparing the first difference value with a plurality of the first difference value ranges, and determining the first difference value range in which the first difference value falls, wherein a local area corresponding to the first difference value range in which the first difference value falls is a sight concentration area of the viewer.

Figure 4:
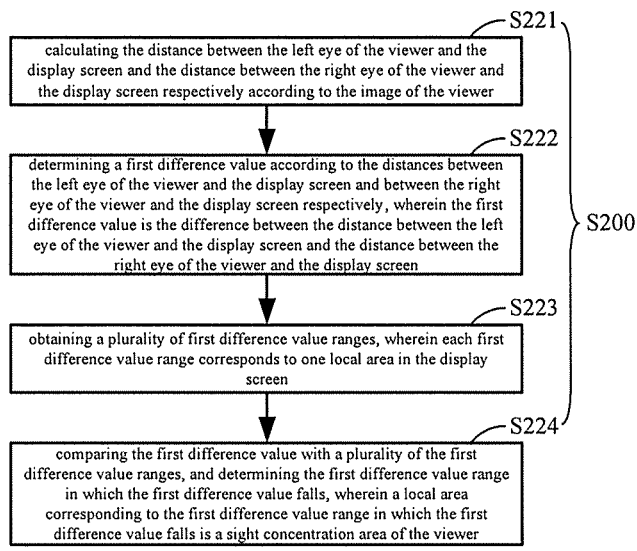
FIG. 4 is Flowchart 2 of Step S200 in FIG. 2 when a display screen is switched from a landscape state to a portrait state.

Referring to FIG. 4 and FIG. 12, the first sight concentration area determination unit firstly calculates the distances between the left eye ZL of the viewer and the display screen 10 and between the right eye ZR of the viewer and the display screen 10 respectively according to the image of the viewer. Then, the first sight concentration area determination unit calculates the difference value between the distance between the left eye ZL of the viewer and the display screen 10 and the distance between the right eye ZR of the viewer and the display screen 10 according to the distances between the left eye ZL of the viewer and the display screen 10 and between the right eye ZR of the viewer and the display screen 10, this difference value is the first difference value D1. Then, the first sight concentration area determination unit obtains a plurality of the first difference value ranges, compares the first difference value D1 with a plurality of the first difference value ranges, and determines the first difference value range in which the first difference value D1 falls, where the local area corresponding to the first difference value range in which the first difference value D1 falls is regarded as the sight concentration area 14 of the viewer.

Figure 5:
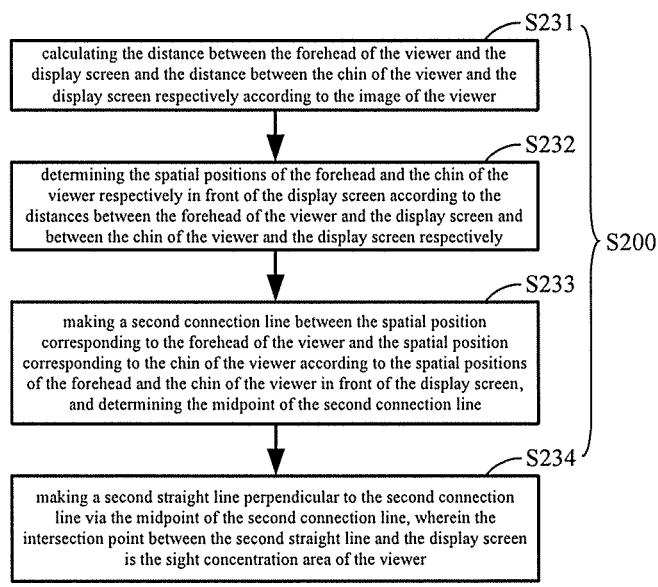
FIG. 5 is Flowchart 1 of Step S200 in FIG. 2 when a display screen is switched from a portrait state to a landscape state.

In some embodiments, before the display screen is switched between the landscape state and the portrait state, when the display screen is in the portrait state, referring to FIG. 5, the step of S200 may further comprise the following steps.

S231: calculating the distance between the forehead of the viewer and the display screen and the distance between the chin of the viewer and the display screen respectively according to the image of the viewer.

S232: determining the spatial positions of the forehead and the chin of the viewer respectively in front of the display screen according to the distances between the forehead of the viewer and the display screen and between the chin of the viewer and the display screen respectively.

S233: making a second connection line between the spatial position corresponding to the forehead of the viewer and the spatial position corresponding to the chin of the viewer according to the spatial positions of the forehead and the chin of the viewer in front of the display screen, and determining the midpoint of the second connection line.

S234: making a second straight line perpendicular to the second connection line via the midpoint of the second connection line, wherein the intersection point between the second straight line and the display screen is the sight concentration area of the viewer.

Referring to FIG. 5 and FIG. 13, the second sight concentration area determination unit firstly calculates the distances between the forehead ZE of the viewer and the display screen 10 and between the chin ZX of the viewer and the display screen 10 respectively according to the image of the viewer. Then, the second sight concentration area determination unit determines the spatial positions of the forehead ZE and the chin ZX of the viewer in front of the display screen 10 according to the distances between the forehead ZE of the viewer and the display screen and between the chin ZX of the viewer and the display screen respectively. Then the second connection line between the spatial position corresponding to the forehead ZE of the viewer and the spatial position corresponding to the chin ZX of the viewer is made, and the midpoint of the second connection line is determined. And then the second straight line perpendicular to the second connection line is made via the midpoint of the second connection line, wherein the intersection point between the second straight line and the display screen 10 is determined as the sight concentration area 14 of the viewer.

In some embodiments, before the display screen 10 is switched between the landscape state and the portrait state, when the display screen is in the portrait state, other ways may also be adopted to determine the view concentration area of the viewer. For example, referring to FIG. 6, the step of S200 may further comprise the following steps.

S241: calculating the distance between the forehead of the viewer and the display screen and the distance between the chin of the viewer and the display screen respectively according to the image of the viewer.

S242: determining a second difference value according to the distances between the forehead of the viewer and the display screen and between the chin of the viewer and the display screen respectively, wherein the second difference value is the difference between the distance between the forehead of the viewer and the display screen and the distance between the chin of the viewer and the display screen.

S243: obtaining a plurality of second difference value ranges, wherein each second difference value range corresponds to one local area in the display screen.

S244: comparing the second difference value with the multiple second difference value ranges and determining a second difference value range in which the second difference value falls, wherein a local area corresponding to the second difference value range in which the second difference value falls is the sight concentration area of the viewer.

Figure 6:
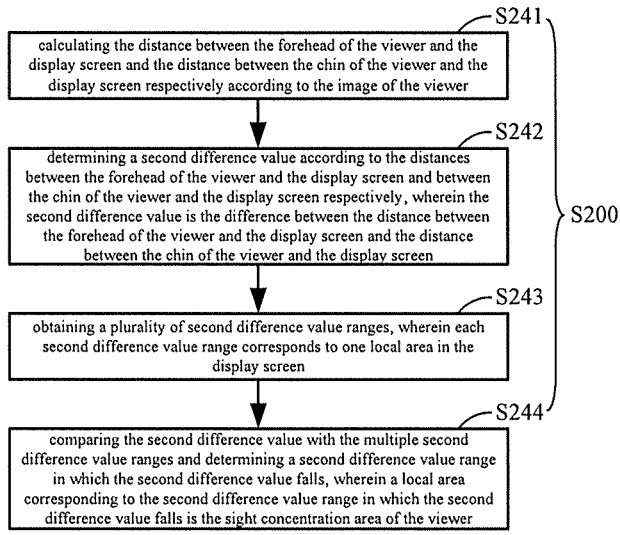
FIG. 6 is Flowchart 2 of Step S200 in FIG. 2 when a display screen is switched from a portrait state to a landscape state.

Referring to FIG. 6 and FIG. 14, the second sight concentration area determination unit calculates the distances between the forehead ZE of the viewer and the display screen 10 and between the chin ZX of the viewer and the display screen 10 respectively according to the image of the viewer. Then, the second sight concentration area determination unit calculates the difference value between the distance between the forehead ZE of the viewer and the display screen 10 and the distance between the chin ZX of the viewer and the display screen 10 according to the distances between the forehead ZE of the viewer and the display screen 10 and between the chin ZX of the viewer and the display screen 10, this difference value is the second difference value D2. Then, the second sight concentration area determination unit obtains a plurality of the second difference value ranges, and compares the second difference value D2 with the plurality of the second difference value ranges, and determines the second difference value range, wherein a local area corresponding to the second difference value range in which the second difference value D2 falls is regarded as the sight concentration area 14 of the viewer.

Figure 7:
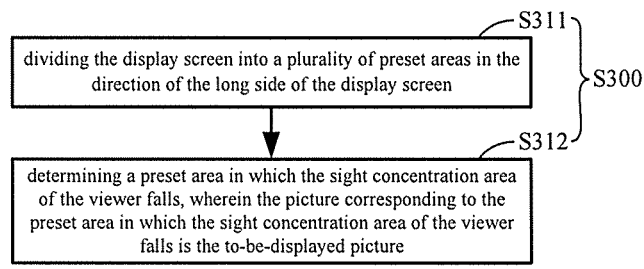
FIG. 7 is Flowchart 1 of Step S300 in FIG. 2.

Referring to FIG. 7, in some embodiments provided by the present disclosure, the step of S300 comprises the following steps.

S311, dividing the display screen into a plurality of preset areas in the direction of the long side of the display screen.

S312: determining a preset area in which the sight concentration area of the viewer falls, wherein the picture corresponding to the preset area in which the sight concentration area of the viewer falls is the to-be-displayed picture.

Referring to FIG. 7 and FIG. 15, before the display screen 10 is switched between the landscape state and the portrait state, the display screen 10 is in a landscape state. As shown in FIG. 15, the display screen 10 is divided into a plurality of the preset areas in the direction of the long side of the display screen 10, that is, in the left-right direction in FIG. 15. For example, referring to FIG. 15, the display screen 10 is divided into a first preset area 11, a second preset area 12, and a third preset area 13. Then, the to-be-displayed picture determination unit determines the preset area in which the sight concentration area 14 of the viewer falls, wherein the picture corresponding to the preset area in which the sight concentration area 14 of the viewer falls is the to-be-displayed picture. For example, referring to FIG. 15, if the to-be-displayed picture determination unit determines that the sight concentration area 14 of the viewer falls in the third preset area 13 in FIG. 15, the picture corresponding to the third preset area 13 in FIG. 15 is the to-be-displayed picture. After the display screen 10 is switched from the landscape state to the portrait state, the display screen 10 displays the to-be-displayed picture processed by the central processing unit, as shown in FIG. 17.

Referring to FIG. 7 and FIG. 18, before the display screen 10 is switched between the landscape state and the portrait state, the display screen 10 is in a portrait state. As shown in FIG. 18, the display screen 10 is divided into a plurality of the preset areas in the direction of the long side of the display screen 10, that is, in the up-down direction in FIG. 18. For example, referring to FIG. 18, the display screen 10 is divided into the first preset area 11, the second preset area 12, and the third preset area 13. Then, the to-be-displayed picture determination unit determines the preset area in which the sight concentrating area 14 of the viewer falls, the picture corresponding to the preset area in which the sight concentrating area 14 of the viewer falls is the to-be-displayed picture. For example, referring to FIG. 18, if the to-be-displayed display determination unit 40 determines that the sight concentration area 14 of the viewer falls in the third preset area 13 in FIG. 18, the picture corresponding to the third preset area 13 in FIG. 18 is the to-be-displayed picture. After the display screen 10 is switched from the portrait state to the landscape state, the display screen 10 displays the to-be-displayed picture processed by the central processing unit, as shown in FIG. 20.

In some embodiments provided by the present disclosure, other ways may also be adopted when the to-be-displayed picture is determined after the display screen is switched between the landscape state and the portrait state. For example, referring to FIG. 8, the step of S300 comprises:

S321: obtaining an expanded area by expanding the sight concentration area of the viewer from itself to the two sides thereof according to the aspect ratio of the display screen in the direction of the long side of the display screen, wherein the ratio of the short side of the display screen to the expanded width of the expanded area matches the aspect ratio of the display screen, the picture corresponding to the expanded area is the to-be-displayed picture.

Figure 8:
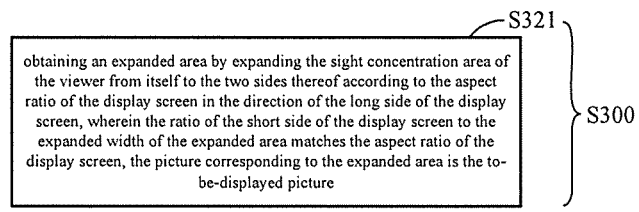
FIG. 8 is Flowchart 2 of Step S300 in FIG. 2.

Referring to FIG. 8 and FIG. 16, before the display screen 10 is switched between the landscape state and the portrait state, the display screen 10 is in a landscape state. As shown in FIG. 16, expansion is performed from the sight concentration area 14 of the viewer to the two sides thereof to obtain the expanded area according to the aspect ratio (that is, length-width ratio) of the display screen 10 in the direction of the long side of the display screen 10, that is, the left-right direction in FIG. 16. The expanded area is rectangular, the long side of the expanded area is the short side of the display screen 10, and the short side of the expanded area is parallel to the long side of the display screen 10. The aspect ratio of the expanded area matches the aspect ratio of the display screen 10, That is, the ratio of the short side of the display screen 10 to the expanded width of the expanded area matches the aspect ratio of the display screen 10. The picture corresponding to the expanded area is the to-be-displayed picture. After the display screen 10 is switched from the landscape state to the portrait state, the display screen 10 displays the to-be-displayed picture processed by the central processing unit, as shown in FIG. 17.

Referring to FIG. 8 and FIG. 19, before the display screen 10 is switched between the landscape state and the portrait state, the display screen 10 is in a portrait state. As shown in FIG. 19, expansion is performed from the sight concentration area 14 of the viewer to the two sides thereof to obtain the expanded area according to the aspect ratio (that is, length-width ratio) of the display screen 10 in the direction of the long side of the display screen 10, that is, the up-down direction in FIG. 19. The expanded area is rectangular, the long side of the expanded area is the short side of the display screen 10, and the short side of the expanded area is parallel to the long side of the display screen 10. The aspect ratio of the expanded area matches the aspect ratio of the display screen 10, That is, the ratio of the short side of the display screen 10 to the expanded width of the expanded area matches the aspect ratio of the display screen 10. The picture corresponding to the expanded area is the to-be-displayed picture. After the display screen 10 is switched from the portrait state to the landscape state, the display screen 10 displays the to-be-displayed picture processed by the central processing unit, as shown in FIG. 20.

It is worth noting that when the sight concentration area 14 of the viewer is located at the edge of the display screen 10 in the direction of the long side of the display screen 10, and when the double of the distance between the sight concentration area 14 of the viewer and the short side of the display screen close to the sight concentration area 14 is smaller than the expanded width of the expanded area, if the expanded area is obtained, the expanded width when the sight concentration area 14 of the viewer expands towards one side of the sight concentration area is different from the expanded width when the sight concentration area 14 of the viewer expands towards the other side of the sight concentration area. For example, as shown in FIG. 16, the sight concentration area 14 of the viewer is close to the right edge of the display screen 10. At this time, when the extended area is obtained, the expanded width when the sight concentration area of the viewer expands to the left side in FIG. 16 is different from the expanded width when the sight concentration area of the viewer expands to the right side in FIG. 16. When the double of the distance between the sight concentration area 14 of the viewer and the short side of the display screen 10 close to the sight concentration area 14 is greater than or equal to the expanded width of the expanded area, if the expanded area is obtained, the expanded width when the sight concentration area 14 of the viewer expands towards one side of the sight concentration area is the same as the expanded width when the sight concentration area 14 of the viewer expands towards the other side of the sight concentration area, and is equal to one half of the expanded width of the expanded area.

With reference to FIG. 2, after the step of S400, the display method of the display device provided by the some embodiments of the present disclosure further comprises the following steps.

S500: facilitating the display screen to be switched between the landscape state and the portrait state.

S600: facilitating the display screen to display the processed to-be-displayed picture.

With reference to FIG. 2, after the step of S300, the display method of the display device provided by some embodiments of the present disclosure further comprises the following steps.

S610: obtaining a retention time of the sight concentration area of the viewer in the to-be-displayed picture.

S620, comparing the retention time with a viewing time threshold.

S630: sending the to-be-displayed picture to the cloud server when the retention time is greater than or equal to the viewing time threshold, wherein the cloud server determines a recommend picture according to the number of the to-be-displayed pictures.

Figure 9:
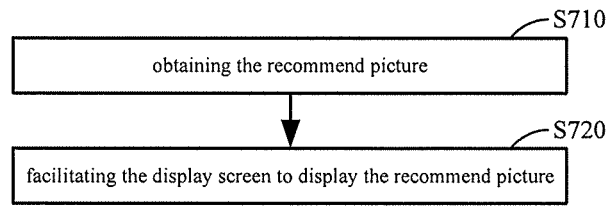
FIG. 9 is a flow chart of another display method of a display device according to some embodiments of the present disclosure.

With reference to FIG. 9, the display method of the display device provided by some embodiments of the present disclosure further comprises the following steps.

S710: obtaining the recommend picture.

S720, facilitating the display screen to display the recommend picture.

When it is not possible to determine the to-be-displayed picture, the central processing unit obtains the recommend picture from the cloud server and facilitates the display screen to display the recommend picture.

Figure 10:
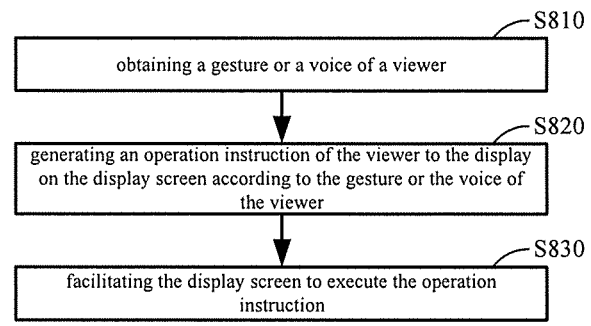
FIG. 10 is a flow chart of yet another display method of a display device according to some embodiments of the present disclosure.

With reference to FIG. 10, the display method of the display device provided by some embodiments of the present disclosure further comprises the following steps.

S810, obtaining a gesture or a voice of a viewer.

S820: generating an operation instruction of the viewer to the picture displayed on the display screen according to the gesture or the voice of the viewer.

S830: facilitating the display screen to execute the operation instruction.

For example, the steps of S810, S820 and S830 may be performed between the step of S400 and the step of S500. The viewer gives the gesture facilitating the display screen to be switched between the landscape state and the portrait state. The information collection unit collects the gesture of the viewer which facilitates the display screen to be switched between the landscape state and the portrait state. The instruction analysis unit generates the operation instruction for facilitating the display screen to be switched between the landscape state and the portrait state according to the gesture. The central processing unit then facilitates the display screen to execute the operation instruction for facilitating the display screen to be switched between the landscape state and the portrait state. The steps of S810, S820 and S830 may also be performed after the step of S600 or the step of S720. The viewer gives a gesture or a voice that facilitates the display screen to exit the display of the to-be-displayed picture or to display the recommend picture. The information collection unit collects the gesture or the voice. The instruction analysis unit generates the operation instruction for facilitating the display screen to exit the display of the to-be-displayed picture or to display the recommend picture. And then the central processing unit facilitates the display screen to execute the operation instruction for exiting the display of the to-be-displayed picture or displaying the recommend picture.

Corresponding to the display method provided by the above embodiments, as shown in FIG. 21, some embodiments of the present disclosure further provide a computer readable storage medium 1500. The computer readable storage medium 1500 stores an instruction thereon, when the instruction is executed by a computer, the computer executes the display method provided in the above embodiments.

The computer-readable storage medium 1500 may be, but not limited to, a system, device or means of electrical, magnetic, optical, electromagnetic, infrared or semiconductor, or any combination of the above. More specific examples (a non-exhaustive list) of the computer-readable storage medium 1500 comprise: an electrical connection having one or more wires, a portable computer diskette, a hard disk, a Random Access Memory (RAM), a read only memory (ROM), an erasable programmable read only memory (EPROM), an optical fiber, a compact disc read-only memory (CD-ROM), a light memory component, a magnetic storage component, or any suitable combination of the foregoing. In some embodiments of the present application, the computer readable storage medium 1500 may be any tangible medium that contains or stores a program. This program may be used by or combined with an instruction execution system, device or means.

Corresponding to the display method provided by the above embodiments, some embodiments of the present disclosure further provide a computer program product. The computer program product stores an instruction thereon. When the instruction is executed by a computer, the computer executes the display method provided in the above embodiments.

In the above description of the embodiments, a specific feature, structure, material, or characteristic may be combined in any suitable manner in any one or more of the embodiments or examples.

The foregoing descriptions are merely specific embodiments of the present disclosure, but the protection scope of the present invention is not limited thereto. Any variation or replacement easily conceivable by those skilled in the art in the technical scope disclosed by the present disclosure shall fall in the protection scope of the present disclosure. Therefore, the protection scope of the present disclosure should be subject to the protection scope of the claims.

What is claimed is:

1. A display device, comprising:
   a display screen, configured to display a picture and be switchable between a landscape state and a portrait state;
   an information collector, configured to collect an image of a viewer; and
   a processor, connected to the display screen and the information collector, and configured to
   determine a sight concentration area of the viewer when the viewer views a picture displayed on the display screen according to the image of the viewer before the display screen is switched between the landscape state and the portrait state;
   determine a to-be-displayed picture after the display screen is switched between the landscape state and the portrait state according to the sight concentration area of the viewer; and
   process the to-be-displayed picture, wherein the processed to-be-displayed picture may cover a whole display surface after the display screen is switched between the landscape state and the portrait state, wherein
   the display device further comprises a timer, the timer is configured to obtain a retention time of the sight concentration area of the viewer in the to-be-displayed picture; and
   the processor is further configured to:
   compare the retention time and a viewing time threshold, send the to-be-displayed picture to a cloud server when the retention time is greater than or equal to the viewing time threshold, wherein the cloud server is configured to determine a recommend picture according to the to-be-displayed picture; and
   obtain the recommend picture, and facilitate the display screen to display the recommend picture.

2. The display device of claim 1, wherein, the processor is configured to:
   calculate a distance between a left eye of the viewer and the display screen and a distance between a right eye of the viewer and the display screen respectively according to the image of the viewer before the display screen is switched between the landscape state and the portrait state when the display screen is in the landscape state, and determine the sight concentration area of the viewer when the viewer views the picture displayed on the display screen before the display screen is switched between the landscape state and the portrait state.

3. The display device of claim 1, wherein, the processor is configured to:
   calculate a distance between a forehead of the viewer and the display screen and a distance between a chin of the viewer and the display screen respectively according to the image of the viewer before the display screen is switched between the landscape state and the portrait state when the display screen is in the portrait state, and determine the sight concentration area of the viewer when the viewer views the picture displayed on the display screen before the display screen is switched between the landscape state and the portrait state.

4. The display device of claim 1, wherein,
   the to-be-displayed picture determined by the processor is a local picture in the picture displayed on the display screen before the display screen is switched between the landscape state and the portrait state according to the sight concentration area of the viewer.

5. The display device of claim 1, wherein, the processor is configured to:
   determine that the display screen is in the landscape state or the portrait state before the display screen is switched between the landscape state and the portrait state.

6. The display device according to claim 1, wherein,
   the information collector is further configured to collect a gesture or a voice of the viewer; and
   the processor is configured to:
   generate an operation instruction of the viewer to the picture displayed on the display screen according to the gesture or the voice of the viewer collected by the information collector; and
   facilitate the display screen to execute the operation instruction.

7. A display method of a display device, comprising:
   collecting an image of a viewer;
   determining a sight concentration area of the viewer when the viewer views a picture displayed on a display screen according to the image of the viewer before the display screen is switched between a landscape state and a portrait state;
   determining a to-be-displayed picture according to the sight concentration area of the viewer after the display screen is switched between the landscape state and the portrait state; and
   processing the to-be-displayed picture, wherein the processed to-be-displayed picture may cover a whole display surface after the display screen is switched between the landscape state and the portrait state,
   obtaining a retention time of the sight concentration area of the viewer in the to-be-displayed picture;
   comparing the retention time with a viewing time threshold;
   sending the to-be-displayed picture to a cloud server when the retention time is greater than or equal to the viewing time threshold, wherein the cloud server determines the recommend picture according to the number of the respective to-be-displayed pictures.

8. The display method of the display device according to claim 7, wherein,
   the to-be-displayed picture is a local picture in the picture displayed before the display screen is switched between the landscape state and the portrait state.

9. The display method of the display device according to claim 7, wherein, before the step of collecting the image of the viewer, the display method of the display device further comprises:

determining that the display screen is in the landscape state or the portrait state before the display screen is switched between the landscape state and the portrait state.

10. The display method of the display device according to claim 9, wherein,
before the display screen is switched between the landscape state and the portrait state, when the display screen is in the landscape state, the step of determining a sight concentration area of the viewer when the viewer views an image displayed on the display screen according to the image of the viewer before the display screen is switched between the landscape state and the portrait state comprises:
calculating a distance between a left eye of the viewer and the display screen and a distance between a right eye of the viewer and the display screen respectively according to the image of the viewer;
determining the spatial positions of the left eye and the right eye of the viewer respectively in front of the display screen according to the distance between the left eye of the viewer and the display screen and the distance between the right eye of the viewer and the display screen respectively;
making a first connection line between the spatial position corresponding to the left eye of the viewer and the spatial position corresponding to the right eye of the viewer according to the spatial positions of the left eye and the right eye of the viewer respectively in front of the display screen, determining a midpoint of the first connection line;
making a first straight line perpendicular to the first connection line via the midpoint of the first connection line, wherein the intersection point between the first straight line and the display screen is the sight concentration area of the viewer;
or,
calculating the distance between the left eye of the viewer and the display screen and the distance between the right eye of the viewer and the display screen respectively according to the image of the viewer;
determining a first difference value according to the distance between the left eye of the viewer and the display screen and the distance between the right eye of the viewer and the display screen respectively, wherein the first difference value is the difference between the distance between the left eye of the viewer and the display screen and the distance between the right eye of the viewer and the display screen;
obtaining a plurality of first difference value ranges, wherein each of the first difference value ranges corresponds to one local area in the display screen;
comparing the first difference value with the plurality of the first difference value ranges, determining the first different value range in which the first difference value falls, wherein a local area corresponding to the first difference value range in which the first difference value falls is the sight concentration area of the viewer.

11. The display method of the display device according to claim 9, wherein,
before the display screen is switched between the landscape state and the portrait state, when the display screen is in the portrait state, the step of determining the sight concentration area of the viewer when the viewer views a picture displayed on the display screen according to the image of the viewer before the display screen is switched between the landscape state and the portrait state comprises:
calculating a distance between a forehead of the viewer and the display screen and a distance between a chin of the viewer and the display screen respectively according to the image of the viewer;
determining the spatial positions of the forehead and chin of the viewer in front of the display screen according to the distance between the forehead of the viewer and the display screen and the distance between the chin of the viewer and the display screen respectively;
making a second connection line between the spatial position corresponding to the forehead of the viewer and the spatial position corresponding to the chin of the viewer according to the spatial positions of the forehead and the chin of the viewer in front of the display screen, determining a midpoint of the second connection line;
making a second straight line perpendicular to the second connecting line via the middle point of the second connection line, wherein the intersection point between the second straight line and the display screen is the sight concentration area of the viewer;
or,
calculating the distance between the forehead of the viewer and the display screen and the distance between the chin of the viewer and the display screen respectively according to the image of the viewer;
determining a second difference value according to the distance between the forehead of the viewer and the display screen and the distance between the chin of the viewer and the display screen respectively, wherein the second difference value is the difference between the distance between the forehead of the viewer and the display screen and the distance between the chin of the viewer and the display screen;
obtaining a plurality of second difference value ranges, wherein each of the second difference value ranges corresponds to one local area in the display screen;
comparing the second difference value with the plurality of the second difference value ranges, determining the second difference value range in which the second difference value falls, wherein a local area corresponding to the second difference range in which the second difference value falls is the sight concentration area of the viewer.

12. The display method of a display device according to claim 7, wherein,
the step of determining a to-be-displayed picture after the display screen is switched between the landscape state and the portrait state according to the sight concentration area of the viewer comprises:
dividing the display screen into a plurality of preset areas in the direction of a long side of the display screen;
determining the preset area in which the sight concentration area of the viewer falls, wherein the picture corresponding to the preset area in which the sight concentration area of the viewer falls is the to-be-displayed picture;
or,
obtaining an expanded area by expanding the sight concentration area of the viewer to the two sides thereof according to the aspect ratio of the display screen in the direction of the long side of the display screen, wherein the ratio of the width of the short side of the display screen to the expanded width of the expanded area matches the aspect ratio of the display screen, a picture corresponding to the expanded area is the to-be-displayed picture.

13. The display method of the display device according to claim 7, wherein,
after the step of processing the to-be-displayed picture, the display method of the display device further comprises:
facilitating the display screen to be switched between the landscape state and the portrait state; and
facilitating the display screen to display the processed to-be-displayed picture.

14. The display method of the display device according to claim 7, wherein, further comprises:
obtaining the recommend picture; and
facilitating the display screen to display the recommend picture.

15. The display method of the display device according to claim 7, wherein, further comprises:
obtaining a gesture or a voice of the viewer;
generating an operation instruction of the viewer to the picture displayed on the display screen; and
facilitating the display screen to execute the operation instruction.

16. A non-transitory computer-readable storage medium comprising an instruction, when the instruction is executed by a computer, the computer executes the display method according to claim 7.

17. A display device, comprising:
a display screen, configured to display a picture and be switchable between a landscape state and a portrait state;
an information collector, configured to collect an image of a viewer; and
a processor, connected to the display screen and the information collector, and configured to
determine a sight concentration area of the viewer when the viewer views a picture displayed on the display screen according to the image of the viewer before the display screen is switched between the landscape state and the portrait state;
determine a to-be-displayed picture after the display screen is switched between the landscape state and the portrait state according to the sight concentration area of the viewer; and
process the to-be-displayed picture, wherein the processed to-be-displayed picture may cover a whole display surface after the display screen is switched between the landscape state and the portrait state, wherein,
the processor is further configured to:
calculate a distance between a forehead of the viewer and the display screen and a distance between a chin of the viewer and the display screen respectively according to the image of the viewer before the display screen is switched between the landscape state and the portrait state when the display screen is in the portrait state, and determine the sight concentration area of the viewer when the viewer views the picture displayed on the display screen before the display screen is switched between the landscape state and the portrait state.

* * * * *